United States Patent
Park et al.

(10) Patent No.: US 10,353,895 B2
(45) Date of Patent: Jul. 16, 2019

(54) ATOMIC VISIBILITY SWITCH FOR TRANSACTIONAL CACHE INVALIDATION

(71) Applicant: SAP SE, Walldorf (DE)

(72) Inventors: Changgyoo Park, Seoul (KR); Yongjae Chuh, Seoul (KR); Juchang Lee, Seoul (KR); Norman May, Frankfurt (DE); Thomas Seufert, Oftersheim (DE); Hannes Jakschitsch, Walldorf (DE)

(73) Assignee: SAP SE, Walldorf (DE)

( * ) Notice: Subject to any disclaimer, the term of this patent is extended or adjusted under 35 U.S.C. 154(b) by 806 days.

(21) Appl. No.: 14/961,309

(22) Filed: Dec. 7, 2015

(65) Prior Publication Data

US 2017/0147638 A1    May 25, 2017

Related U.S. Application Data

(60) Provisional application No. 62/259,405, filed on Nov. 24, 2015.

(51) Int. Cl.
   *G06F 16/00*    (2019.01)
   *G06F 16/2453*    (2019.01)
   (Continued)

(52) U.S. Cl.
   CPC .... *G06F 16/24539* (2019.01); *G06F 16/2282* (2019.01); *G06F 16/2308* (2019.01); *G06F 16/2379* (2019.01); *G06F 16/24552* (2019.01)

(58) Field of Classification Search
   CPC ......... G06F 17/30339; G06F 17/30377; G06F 17/30457; G06F 17/3048; G06F 17/30174;
   (Continued)

(56) References Cited

U.S. PATENT DOCUMENTS 7,457,828 B2    11/2008  Wenner et al.
8,069,313 B2    11/2011  Potnis et al.
(Continued)

FOREIGN PATENT DOCUMENTS

WO    WO 2008/149101 A2    12/2008

OTHER PUBLICATIONS

Extended European Search Report dated Feb. 27, 2017, for European Application No. 16002465.9; 10 pages.
(Continued)

*Primary Examiner* — Cheryl Lewis
(74) *Attorney, Agent, or Firm* — Sterne, Kessler, Goldstein & Fox P.L.L.C.

(57) ABSTRACT

Disclosed herein are systems, methods, and computer program products for providing transaction-consistent snapshots of data stored in or associated with a database. An embodiment operates by receiving, at a source database, an update request to update data associated with a table stored at the source database, and modifying a value of a modification-in-progress data structure corresponding to the table to indicate that a modification is in progress for the table. The embodiment includes updating a value of a commit identification counter and a table time stamp associated with the table to indicate that cached data having a time stamp older than the updated time stamp are invalid. The embodiment further includes modifying the value of the modification-in-progress counter to indicate completion of table modification.

17 Claims, 12 Drawing Sheets

(51) Int. Cl.
*G06F 16/22* (2019.01)
*G06F 16/23* (2019.01)
*G06F 16/2455* (2019.01)

(58) Field of Classification Search
CPC ......... G06F 17/30368; G06F 17/30554; G06F 16/2308; G06F 16/24539; G06F 16/24552; G06F 16/2379; G06F 16/2282
See application file for complete search history.

(56) References Cited

U.S. PATENT DOCUMENTS

| | | | |
|---|---|---|---|
| 8,589,361 B2 | 11/2013 | Hu et al. | |
| 9,152,626 B2 | 10/2015 | Seufert et al. | |
| 9,342,411 B2 | 5/2016 | Belluomini et al. | |
| 2003/0236957 A1 | 12/2003 | Miller et al. | |
| 2005/0240745 A1 | 10/2005 | Iyer et al. | |
| 2008/0098041 A1 | 4/2008 | Chidambaran et al. | |
| 2009/0187599 A1* | 7/2009 | Bruso | G06F 17/30312 |
| 2013/0080388 A1* | 3/2013 | Dwyer | G06F 17/3048 707/634 |
| 2014/0149387 A1* | 5/2014 | Konik | G06F 17/30442 707/713 |
| 2014/0172944 A1 | 6/2014 | Newton et al. | |
| 2014/0173185 A1 | 6/2014 | Belluomini et al. | |
| 2014/0324785 A1 | 10/2014 | Gupta et al. | |
| 2016/0042023 A1* | 2/2016 | Leach | G06F 9/466 707/703 |
| 2016/0110284 A1 | 4/2016 | Athalye et al. | |
| 2017/0147638 A1 | 5/2017 | Park et al. | |

OTHER PUBLICATIONS

Kevin Wilkinson and Marie-Anne NEIMAT, "Maintaining Consistency of Client-Cached Data," Proceedings of the 16th VLDB Conference, 1990; 12 pages.
Michael J. Carey et al., "Data Caching Tradeoffs in Client-Server DBMS Architectures," ACM, 1991; 10 pages.
Extended European Search Report dated Feb. 27, 2017, for European Application No. 16002452.7; 9 pages.
Summons to attend oral proceedings pursuant to Rule 115(1) EPC, dated May 16, 2019, for European Patent Application No. 16002452.7; 12 pages.

* cited by examiner

ATOMIC VISIBILITY SWITCH FOR TRANSACTIONAL CACHE INVALIDATION

CROSS REFERENCE TO RELATED APPLICATIONS

The present application claims the benefit of U.S. Provisional Patent Application No. 62/259,405, filed on Nov. 24, 2015, which is hereby incorporated by reference in its entirety.

BACKGROUND

Nearly all commercial database systems rely on caching techniques to improve performance. Due to the lowering cost of memory as well as increasing computing speeds, databases today can be large. Large databases can make querying a database for specific information a computationally intensive process. Caching mechanisms have been used by database systems to help reduce the computational complexity of querying databases. Caches are often implemented in memory that can be accessed quickly, such as random access memory (RAM), as opposed to storage that takes longer to access, such as disk-based storage. Caches typically store frequently used data and reduce the time needed by a database system to access a data page.

Cached entries typically depend on other data such as referenced tables or views. For example, a query result may depend on multiple referenced tables, some of which may be recursively accessed. However, transactions within the database system may cause a table's entries to get modified or deleted. In order to provide transaction-consistent snapshots of the data in a database, the cached content corresponding to modified tables need to be invalidated.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Providing an efficient cache invalidation mechanism is a challenging problem. A cache node maintains a time stamp associated with the cached data. This time stamp is typically associated with all entries in the cache node. Accordingly, if an entry in a single table gets updated in the source database, all tables in the cache node will have an outdated time stamp and will be invalidated.

Provided herein are system, method and/or computer program product embodiments, and/or combinations and sub-combinations thereof, for invalidating data that has been cached in one or more cache nodes that are coupled with a source database. The systems and methods disclosed herein improve cache efficiency by eliminating unnecessary cache invalidation.

In an embodiment, each source table has its own time stamp. The time stamp may, for example, be saved as an attribute of the source table in the source database. Furthermore, in this embodiment, each cached entity (stored in a cache node) also has its own time stamp, that indicates the time stamp at which the cached entity was retrieved from one or more database tables from source database. Therefore, in a given cache node, each cached entity may be separately invalidated without affecting the validity of other cached entities.

Typically, when a result of a request (such as, but not limited to, query result, result of authorization check, indexes derived from one or more tables, result of cache look up, etc.) is found in a cache node, the time stamp of the cached entity associated with the request result is checked. If the cached entity's time stamp is less than the latest time stamp of the source database, it is determined that the cached entity contains outdated data, and should not be used to reply to the request.

Figure 1:
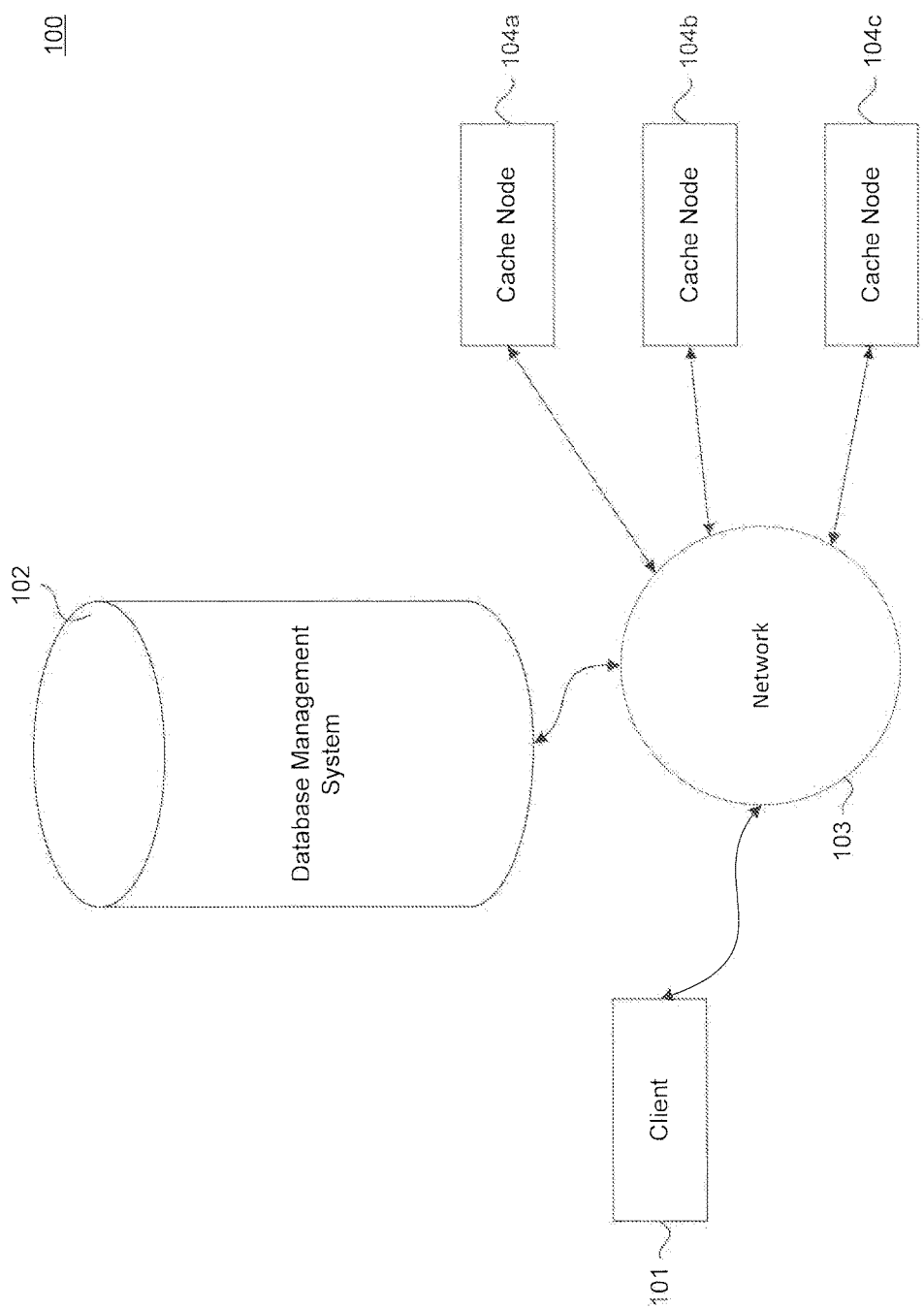
FIG. 1 is a block diagram of a shared disk database system that includes multiple caches in multiple nodes, according to an example embodiment.

Directing to FIG. 1, an example database computing environment 100 is illustrated in which embodiments can be implemented. Database environment 100 includes a database management system (DBMS) 102 and a client 101 that communicates with DBMS 102. DBMS 102 may be a system executing on a server and accessible to client 102 over a network, such as network 103, described below. Although client 101 is represented in FIG. 1 as a separate physical machine from DBMS 102, this is presented by way of example, and not limitation. In an additional embodiment, client 101 occupies the same physical system as DBMS 102. In a further embodiment, client 101 is a software application that requires access to DBMS 102. In another embodiment, a user may operate client 101 to request access to DBMS 102. Throughout this specification, the terms client and user will be used interchangeably to refer to any hardware, software, or human requestor, such as client 101, accessing DBMS 102 either manually or automatically. Additionally, both client 101 and DBMS 102 may execute within a computer system, such as an example computer system discussed in FIG. 11.

Client 101 and DBMS 102 may communicate over network 103. Network 103 may be any network or combination of networks that can carry data communications. Such a network 103 may include, but is not limited to, a local area network, metropolitan area network, and/or wide area network that include the Internet.

DBMS 102 may receive a request, such as a query, from client 101. The request may be used to retrieve, modify, append, or otherwise manipulate or access data stored in DBMS 102 and/or cache nodes 104, as will be further described with respect to FIG. 2.

In order to expedite responding to requests, such as queries, copies of data stored in DBMS 102 may be stored in one or more cache nodes, such as cache nodes 104a-104c (herein referred to collectively as cache node 104). Although cache nodes 104a-104c are represented as physical machines remote from DBMS 102, this is presented by way of example, ad not limitation. While in the example embodiment illustrated in FIG. 1, cache nodes 104a-104c communicate with DBMS 102 via network 103, in an additional embodiment, one or more of cache nodes 104a-104c are local to DBMS 102, e.g., directly connected to DBMS 102. Storing and accessing data in cache nodes is described in further detail below.

Figure 2:
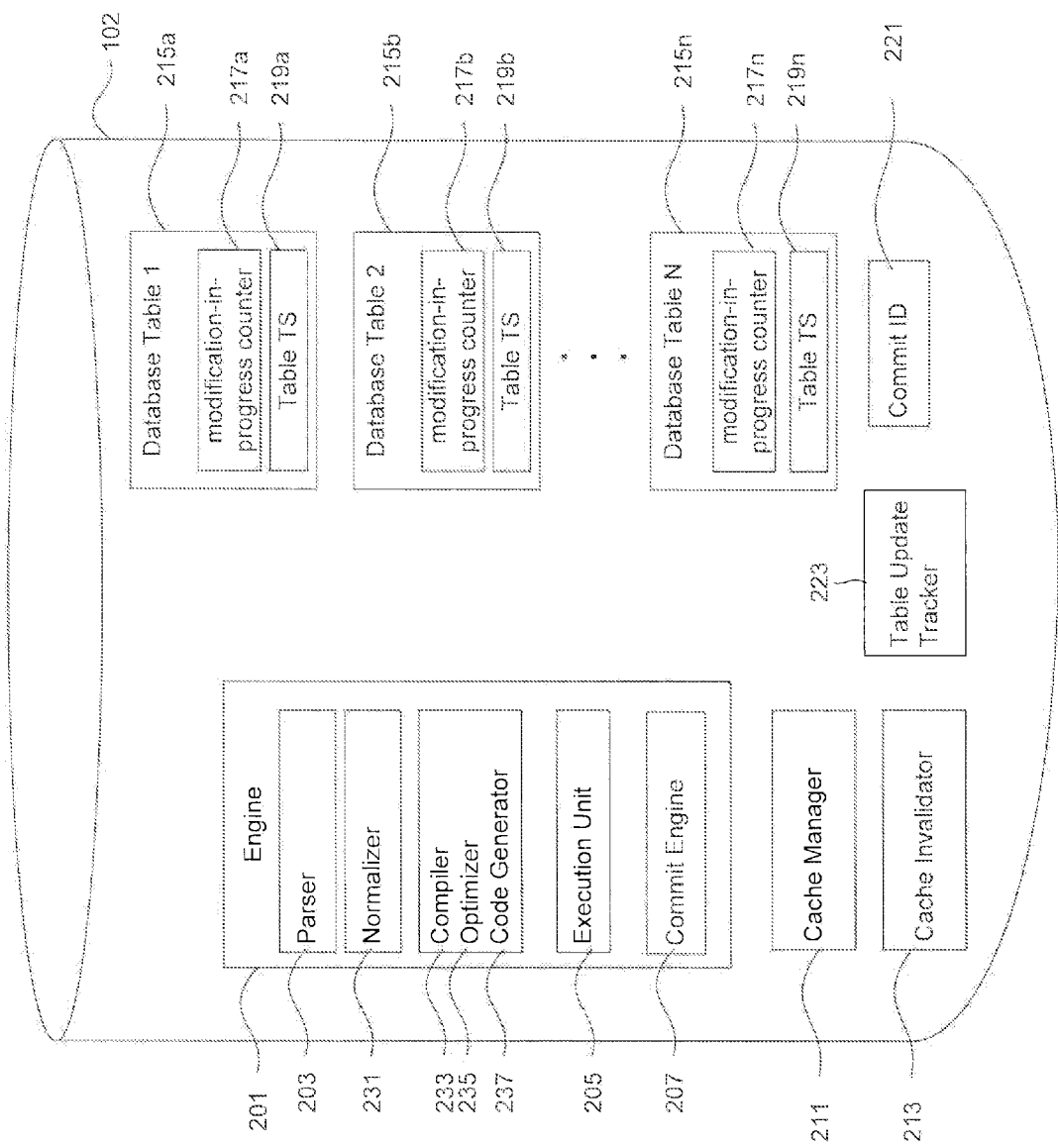
FIG. 2 illustrates a database management system, according to an example embodiment.

Directing to FIG. 2, example components of DBMS 102 are illustrated. In one example, DBMS 102 can include a server or be part of a server. For example, DBMS 102 can be implemented by and/or include processing logic that can comprise hardware (e.g., circuitry, dedicated logic, programmable logic, microcode, etc.), software (e.g., instructions executing on a processing device), or a combination thereof. DBMS 102 comprises a query handling engine 201, a plurality of database tables 215a-215n (also referred to as source database tables) stored in DBMS 102, and a global (DBMS-wide) commit ID data structure 221 (also referred to as commit identification counter). DBMS 102 further comprises a cache manager 211, a cache invalidator 213, and a table update tracker 223. Each of these components will be described in turn in the following.

In one example, to process a query, DBMS 102 includes a query handling engine 201 that in turn comprises a parser module 203, an execution unit 205, and a commit engine 207. The query handing engine components are described below with respect to their functionality, as it pertains to handling a query addressed to DBMS 102.

A query may be transmitted to DBMS 102 by client 101 using syntax that conforms to a query language. In an example embodiment, the query language is a Structured Query Language ("SQL"), but may be another query language. DBMS 102 is able to interpret the query in accordance with the query language and, based on the interpretation, generate requests to database tables 215a-215n.

A query may be generated by a user using client 101 or by an application executing on client 101. Upon receipt, DBMS 102 begins to process the query. Once processed, the result of the processed query is transmitted from DBMS 102 to client 101 in a query result.

Parser module 203 parses the received queries. In an embodiment, parser 162 may convert a query into a binary tree data structure that represents the format of the query. In other embodiments, other types of data structures may be used.

When parsing is complete, parser module 203 passes the parsed query to the normalizer 231. Normalizer 231 may normalize the parsed query. For example, normalizer 231 may eliminate redundant SQL constructs from the parsed query, and/or also performs error checking on the parsed query that confirms that the names of the tables in the parsed query conform to the names of tables stored in DBMS 102. Normalizer 231 may also confirm that relationships among tables stored in DBMS 102, as described by the parsed query, are valid.

Still considering FIG. 2, once normalization is complete, normalizer 231 passes the normalized query to compiler 233. Compiler 233 compiles the normalized query into machine-readable format. The compilation process determines how a query is executed by DBMS 102. To ensure that a query is executed efficiently, the compiler 233 may perform a query optimizer 235 in order to generate an access plan for executing the query.

Query optimizer 235 analyzes the query and determines a query plan for executing the query. The query plan retrieves and manipulates information in the database tables stored in DBMS 102 in accordance with the query semantics. This may include choosing the access method for each table accessed, choosing the order in which to perform a join operation on the tables, and choosing the join method to be used in each join operation. As there may be multiple strategies for executing a given query using combinations of these operations, query optimizer 235 may also include generating and evaluating a number of strategies from which to select the best strategy to execute the query.

In an embodiment, query optimizer 235 generates multiple query plans. Once generated, query optimizer 235 selects a single query plan from the multiple query plans to execute the query. The selected query plan may be a cost efficient plan, a query plan that uses the least amount of memory in DBMS 102, a query plan that executes the quickest, or any combination of the above, to give a few examples.

In an embodiment, in order for query optimizer 235 to generate and select a query plan, the execution unit 205 may use data statistic to estimate the computational cost of a particular query plan. For example, an estimate of the size (i.e., number of rows) of a query plan may be considered in order to select an efficient query plan. Based on the estimate, query optimizer 235 selects an efficient query plan that executes the query from multiple query plans.

As part of its function, query optimizer 235 may also generate indexes to ensure that that information from the tables stored in DBMS 102 can be retrieved quickly and efficiently. An index is a sorted copy of selected database table fields that can allow for a query to retrieve information quickly and without having to scan the entire database to retrieve a selection of information.

In an embodiment, code generator 237 generates the code necessary for DBMS 103 to realize the selected efficient query plan. An execution unit 205 executes the generated code.

Still considering FIG. 2, queries received at DBMS 102 may include read and/or write requests. While read requests only retrieve data already stored in the tables within DBMS 102, such as database tables 215a-215n, write requests necessitate data modification and/or data deletion on one or more of these tables. Commit engine 207 is used to handle the write requests. In database management systems, a "commit" is referred to the making of a set of tentative changes permanent. For example, in SQL, a commit statement ends a transaction within a database management system and makes all changes visible to all clients. In SQL, the general format is to issue a "begin work" statement, one or more SQL statements, and then the commit statement.

Alternatively, in SQL, a "rollback" statement can be issued, which undoes all the work performed since "begin work" was issued.

It is noted that although this example is illustrated according to a database query, the embodiments of this disclosure are not limited to a database query. The embodiments of this disclosure can apply to any request from client 101, cache nodes 104, etc. The embodiments of this disclosure can apply to any method to derive the relevant table(s) for any request. For example, the request can include, but not limited to, request for data such as authorization check, request for indices derived from one or more tables, cache look up, etc.

In one example, during a transaction, change requests received by query handling engine 201 can be stored in a data modification log that can be written to a non-volatile log storage (e.g., one or more disks) at data modification time. A commit log can be a log that can permanently mark that the corresponding transaction is successfully committed and previously written data modification log is valid. In one example, when a commit request is processed, commit engine 207, for example, can write the commit log to a non-volatile log storage. Upon the completion of those changes, commit engine 207 increments a commit ID, such as commit ID 221, that is a DBMS-wide global counter. Commit ID 221 effectively tracks the version of data in tables 215a-215n. Old versions of data stored in tables 215a-215n may be stored in a separate storage space in DBMS 102, or in one or more cache nodes, such as 104a-104c, and retrieved upon request.

Still considering FIG. 2, DBMS 102 further comprises one or more database tables, such as database tables 215a-215n. Each of the database tables 215a-215n has a table time stamp attribute associated with it, as indicated by 219a-219n. This table time stamp is typically a counter indicating the maximum commit ID among committed transactions that have updated the table. This table time stamp can be updated based on the commit ID. The table time stamp attribute for each database table may be stored in the database table itself, or in another data structure such as table update tracker 223, as will be described below, or any other data structure associated with DBMS 102. Additionally, each table stored in DBMS 102 comprises a modification-in-progress counter. It is noted that a person of ordinary skill in the art would understand that other data structures can be used instead to achieve the same functionality as the modification-in-progress counter, such as, but not limited to, flags, integers, etc. For example, database table 215a has an modification-in-progress counter 217a stored therein, database table 215b has another modification-in-progress counter 217b stored therein, and so on. As will be described in detail with respect to FIGS. 4-10, modification-in-progress counters are used to ensure that, upon the request of one or more cache nodes, such as cache nodes 104a-104c, up-to-date table time stamp information is provided for each database table. Although modification-in-progress counter data structures are shown to be stored in database tables, it is noted these modification-in-progress counter data structures can be stored in other data structure associated with DBMS 102. In one embodiment, each source table has its own table time stamp and its own modification-in-progress counter. In this embodiment, each cached entity (stored in a cache node) also has its own time stamp, that indicates the time stamp at which the cached entity was retrieved from one or more database tables from source database. In this embodiment, by using the table time stamp and the modification-in-progress counter associated with each table, each cached entity in a given cache node may be separately invalidated without affecting the validity of other cached entities.

Still considering FIG. 2, DBMS 102 further comprises a table update tracker 223 that updates the time stamp associated with each database table that has been updated. Since each database table has a separate table time stamp, updating, deleting, or otherwise modifying information stored in one database table, only results in the time stamp of that database table to be affected (incremented), and leaves the time stamp of other database tables intact. For example, if as a result of a data modification request, data in database table 215a is modified, only table time stamp 219a is updated. In another example, if the metadata associated with table 215b is modified, only table time stamp 219b is updated.

According to one example, table time tracker 223 can also be configured to manage copies of one or more of table time stamps 219a-219n in one or more of cache nodes. For example, when cache node 104 caches a cached entity from database table 215a, cache node 104 can register with table time tracker 223 so that table time tracker 223 will maintain a copy of table time stamp 219a in cache node 104, as discussed in more detail below. In this example, table time tracker 223 can be configured to invalidate the copy of table time stamp 219a in cache node 104 when table time stamp 219a is changed and/or is in the process of being changed. In another example, a cached entity may result from a request result (e.g., a query result) associated with two or more database tables 215a-215n due, e.g., to dependency between two or more of database tables 215a-215n. In this example, table time tracker 223 can be configured to invalidate the cached entity in cache node 104 when updates to any of the two or more database tables 215a-215n is performed. In this example, table time tracker 223 will maintain copies of two or more table time stamp 219a-219n corresponding to two or more of database tables 215a-215n in cache node 104. In one example, all cache nodes that have cached results from tables 215a-215n can automatically be registered with table time tracker 223 so that table time tracker 223 would maintain their copies of table time stamps. Alternatively, cache nodes can decide whether or not to register with table time tracker 223. Table time stamps 219a-219n, associated with database tables 215a-215n may be stored in table update tracker 223, and updated as changes are made to the corresponding tables. Alternatively, table time stamps 219a-219n may be stored in their corresponding tables, and table update tracker 223 updates the table time stamps as changes are made to the database tables. In this example, table time stamps 219a-219n indicate the last time their corresponding tables have been updated.

Embodiments of the disclosure provide a novel method for updating table time stamps 219a-219n and commit ID 221 such that no outdated data is provided from a cache node (such as any of cache nodes 104a-104c). This method will be described in detail with respect to FIGS. 4-10.

Still considering FIG. 2, DBMS 102 further comprises a cache manager 211. Cache manager 211 maintains a list of all cache nodes that are at the disposal of DBMS 102. When a cache node, e.g., cache node 104c, is added to serve DBMS 102, the cache node registers itself with cache manager 211. Consequently, cache manager 211 adds the name of the cache node 104c to the list of all cache nodes it manages. Similarly, when a cache node, e.g., cache node 104c, is removed from the disposal of DBMS 102, it unregisters itself from cache manager 211. Consequently, cache manager 211 removes cache node 104c from the list of cache nodes it manages. Cache manager 211 may further perform other services with respect to its managed cache nodes, such as collecting cache usage statistics and distributing the available memory budget across the cache nodes. Cache manager 211 may further allow inter-cache node communication in a distributed fashion.

DBMS 102 can further comprise cache invalidator 213. When cache entries are inserted into the cache, they can be associated with dependent objects. As previously described, objects stored in database tables 215a-215n may be updated. The updates may be addressed to metadata, data or privileges, or other types. Upon update of a dependent object, cache invalidator 213 can notify cache nodes, such as cache nodes 104 about changes. These notifications are dispatched based on the registered dependencies. For faster invalidation, cache entries are marked as invalid. This allows for lookups of older snapshots based on transaction identifier and asynchronous garbage collection of invalid cache entries. Invalidation can be triggered manually for a specific cache entry. Additionally, automatic invalidation may be triggered upon changes to data for which dependencies are registered. These dependencies can be specified when a cache entry is added to the cache, and recursive dependencies are resolved. A dependency is described by an identifier (e.g. objected), a type (e.g. table), and change flags (e.g. metadata change). The type and change flag guide the invalidation process and are used to filter irrelevant events. As a non-limiting example, a cache node for a SQL view can reference another view and three tables. Then the view and the three tables will be dependent objects. Embodiments of this disclosure can recursively resolve these dependencies down to the level of tables, and the update tracking is performed on the table level.

Figure 3:
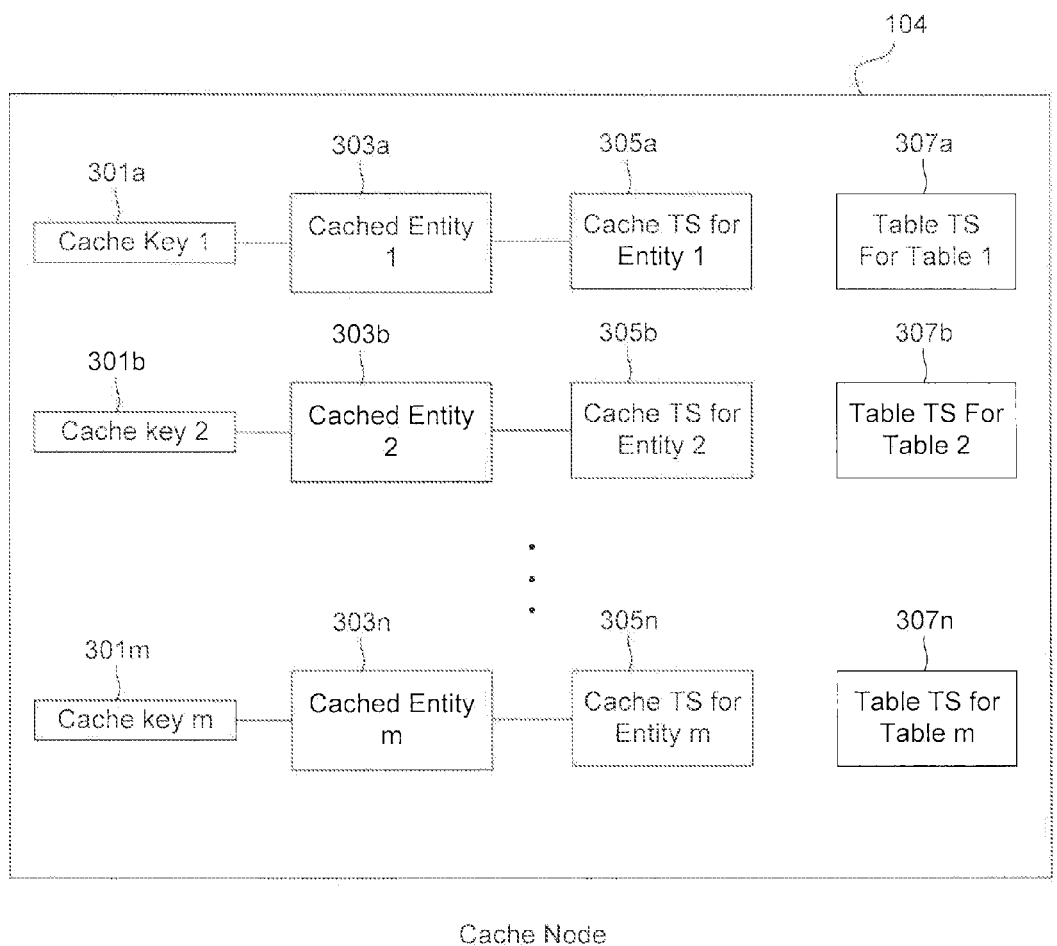
FIG. 3 illustrates a cache node, according to an example embodiment.

Directing to FIG. 3, a cache node 104 (such as cache node 104a, 104b or 104c) is illustrated with example data structures stored therein, according to an embodiment. In one example, cache node 104 can include a server or be part of a server. For example, cache node 104 can be implemented by and/or include processing logic that can comprise hardware (e.g., circuitry, dedicated logic, programmable logic, microcode, etc.), software (e.g., instructions executing on a processing device), or a combination thereof. Cache node 104 comprises a set of cache keys 301a-301m, corresponding cached entities 303a-303m, and corresponding cached entity time stamps 305a-305n. Each cached entity 303a-303m comprises a cached request result (e.g., a cached query result, cached result of authorization check, cached indexes derived from one or more tables, etc.) that mirrors the information found in a corresponding source database table(s) found in DBMS 102. For example, as illustrated, cache key 301a is associated with a cached entity 303a that corresponds to database table 215a in FIG. 2. Additionally, cached entity 303a corresponding to cache key 301a further comprises a cached entity time stamp 305a, that reflects the time cached entity 303a was retrieved from one or more source database tables in DBMS 102. Cache key 301a and/or cached entity 303a may reference an arbitrary number of source tables and/or source table fragments. For example, cache key 301a and/or cached entity 303a may reference one or more tables and the set of referenced tables for a cached entity may overlap. According to one example, cache key 301 can include information that can be used to identify and/or locate the cached entity. For example, cache key 301 may include instructions used in the request, the query string, table object identifier (OID), partition OID, etc. In other words, when, in one example, a query was made to DBMS 102, and the result of the query was in source table 215a, a copy of this result (also referred to as a replica) could be also stored in cached entity 303a. Accordingly, for further queries, the query may be directed to cache node 104, and after it is determined that a key associated with the query matches a cache key 301, the result can be retrieved from cache node 104 and cached entity 303a, instead of table 215a.

Cache node 104 may also store information indicating the latest table time stamp for each source table it has cached therein. For example, as illustrated, table time stamps 307a-307m correspond to cached entities 303a-303m and maintain the values of the latest time stamp of the corresponding source database tables in DBMS 102. In other words, table time stamps 307a-307m in cache node 104 can be copies of table time stamps 219a-219n in the source node (e.g., DBMS 102). When a source table and its corresponding cache are located at two different worker nodes, then every table time stamp lookup will involve inter-node communication. Therefore, in one embodiment, copies of table time stamps are stored in the cache nodes to decrease the time needed for inter-node communication. However, these copies of table time stamps need to be updated efficiently. In one example, cached entity 303a in cache node 104 corresponds to all or a subset of data stored in table 215a in the source node (e.g., DBMS 102). Cached entity time stamp 305a corresponds to the time stamp that cached entity 303a was cached. In this example, table time stamp 307a include a copy of the table time stamp 217a when table 215a was last updated. In another example, cached entity 303b in cache node 104 corresponds to subsets of data stored in tables 215a and 215b in the source node (e.g., DBMS 102). As in the previous example, cached entity time stamp 305b corresponds to the time stamp that cached entity 303b was cached. However, unlike in the previous example, here the validity of cached entity 303b will depend on whether there were any updates to either of tables 215a and 215b after cached entity 303b was stored in cache node 104. As discussed above and will be discussed in more detail with respect to FIGS. 7-10, table update tracker 223 of the source node (e.g., DBMS 102) can be configured to control the validity of table time stamps 307a-307m. Optionally, cache node 104 may comprise a garbage collector module that examines all cached entries stored therein and deletes those that are marked as invalid.

Updating Table Time Stamps in DBMS and Handling Cache Queries

FIGS. 4, 5, 6A and 6B describe how table time stamps are updated, and requests are handled in order to provide transaction-consistent snapshots on cache nodes, according to an embodiment. In one example, DBMS 102 that includes tables 215a-215n can be a source node that includes the source tables from which cached entities are cached. Additionally or alternatively, a source node can be any processing logic that can comprise hardware (e.g., circuitry, dedicated logic, programmable logic, microcode, etc.), software (e.g., instructions executing on a processing device), or a combination thereof, that can include source tables from which cached entities are cached.

Figure 4:
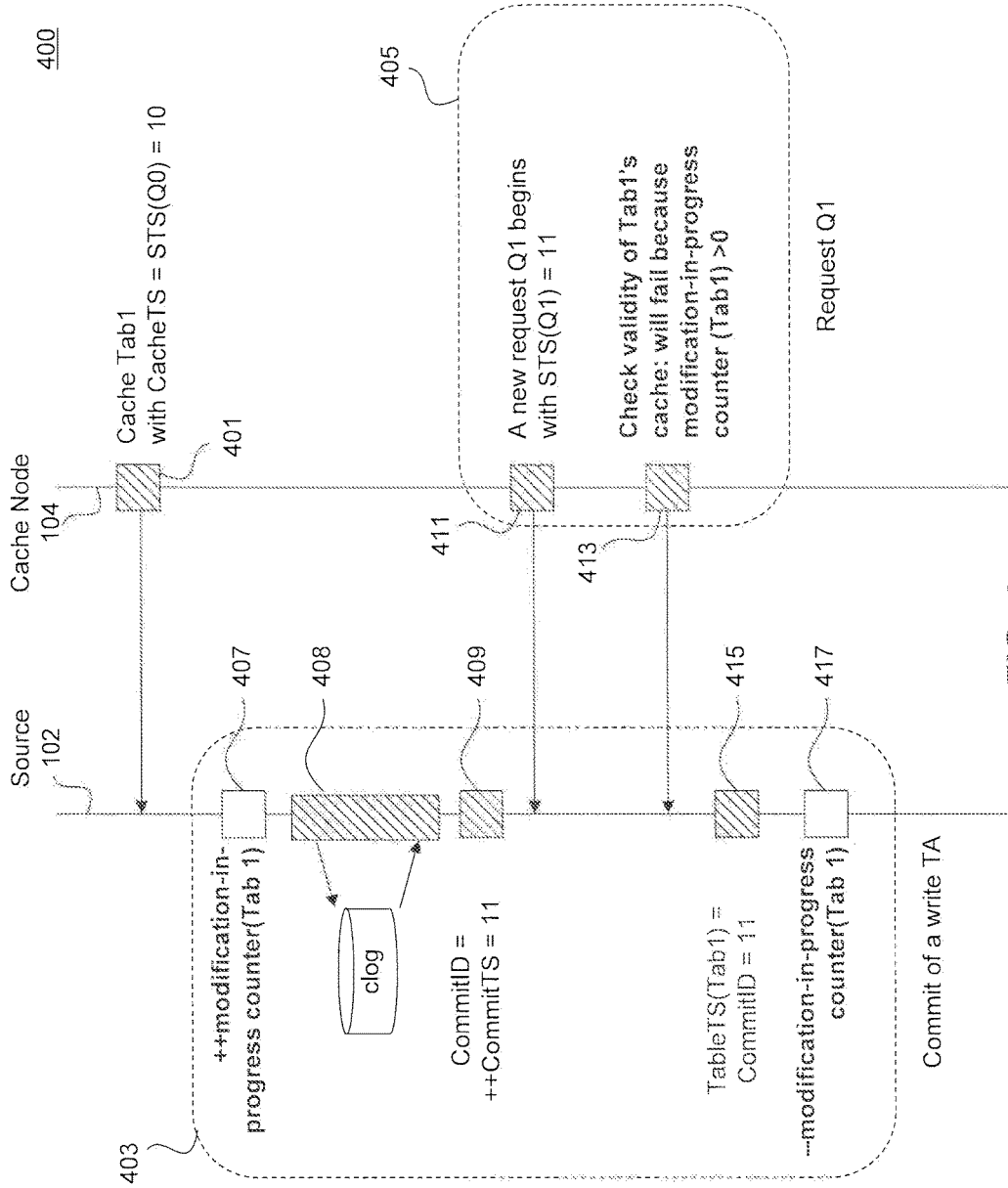
FIG. 4 is a sequence diagram describing the process of updating table time stamps and table time stamp querying by cache nodes, according to an example embodiment.

Directing to FIG. 4, an example sequence diagram 400 describing the process of updating table time stamps in DBMS 102, and table time stamp querying by cache nodes from DBMS 102 is illustrated according to an embodiment. In order to facilitate describing this process, data structures previously introduced in FIG. 2 are often referred to. Time diagram 400 can be performed by processing logic that can comprise hardware (e.g., circuitry, dedicated logic, programmable logic, microcode, etc.), software (e.g., instructions executing on a processing device), or a combination thereof In step 401, and at, for example, time stamp 10, a copy of data stored in source database table 1 is stored in cache node 104, possibly as a result of a query from DBMS 102 that required access to and the retrieval of database table 1. However, this step 401 can be result of any request to store any of source table(s) and/or a subset of data in any fragments of the source table(s). Cache node 104 stores this data with a cache time stamp 10, in a data structure similar to those depicted in FIG. 3.

Once an update request (e.g., a commit statement/request) is issued in 403, data stored in, or metadata associated with a database table, such as database table 215a, is required to be modified. To handle this, at step 407, the value of the modification-in-progress counter corresponding to the database table, such as modification-in-progress counter 217a is incremented. It is noted that the update request 403 can include updates to more than one table and accordingly, more than one modification-in-progress counters can be involved. At step 408, commit engine 207 (as an example) can write the commit log (that can be a log that can permanently mark that the corresponding transaction is successfully committed and previously written data modification log is valid) to a long term memory storage (e.g., a non-volatile log storage such as a disk). In one example, this operation can be a time consuming operation. At step 409, the value of commit ID 221 is incremented to the next time stamp, e.g., 11.

At 405, a request Q1, with time stamp of 11, is issued from cache node 104 to source DBMS 102. This request Q1 can be based on a cache look up to cache node 104 sent to cache manager. Additionally or alternatively, request Q1 can be based on a database query to the source node. In one example, request Q1 can be based on a query that the source node has directed to (e.g., forwarded) to cache node 104. Because of request Q1, cache node 104, at step 411, may request DBMS 102 to identify the latest time stamp of one or more database tables stored therein, such as database table 215a. However, DBMS 102 has already been in the process of modifying table 215a, due to the issuance of update request (e.g., commit statement) 403. That is, the commit ID 221 has already been updated, but the table time stamp for table 215a has not been updated yet. Therefore, at such a transitory state, any time stamp information returned by DBMS 102 to cache node 104 would reflect outdated information. In order to resolve this issue, in step 413, a validity check is made to identify whether modification-in-progress counter 217a is greater than zero. If the value of modification-in-progress counter 217a is determined to be greater than zero, it is indicated that database table 215a is undergoing an update. Accordingly, the previous copy of this database table cached in cache node 104 at time stamp 10 is no longer valid.

At step 415, the table time stamp of the updated table 217a is set equal to the value of commit ID 221. Finally, at step 417, all the operations regarding effecting the commit statement issued at 403 is completed, and the value of modification-in-progress counter 217a is decremented back to zero.

Figure 5:
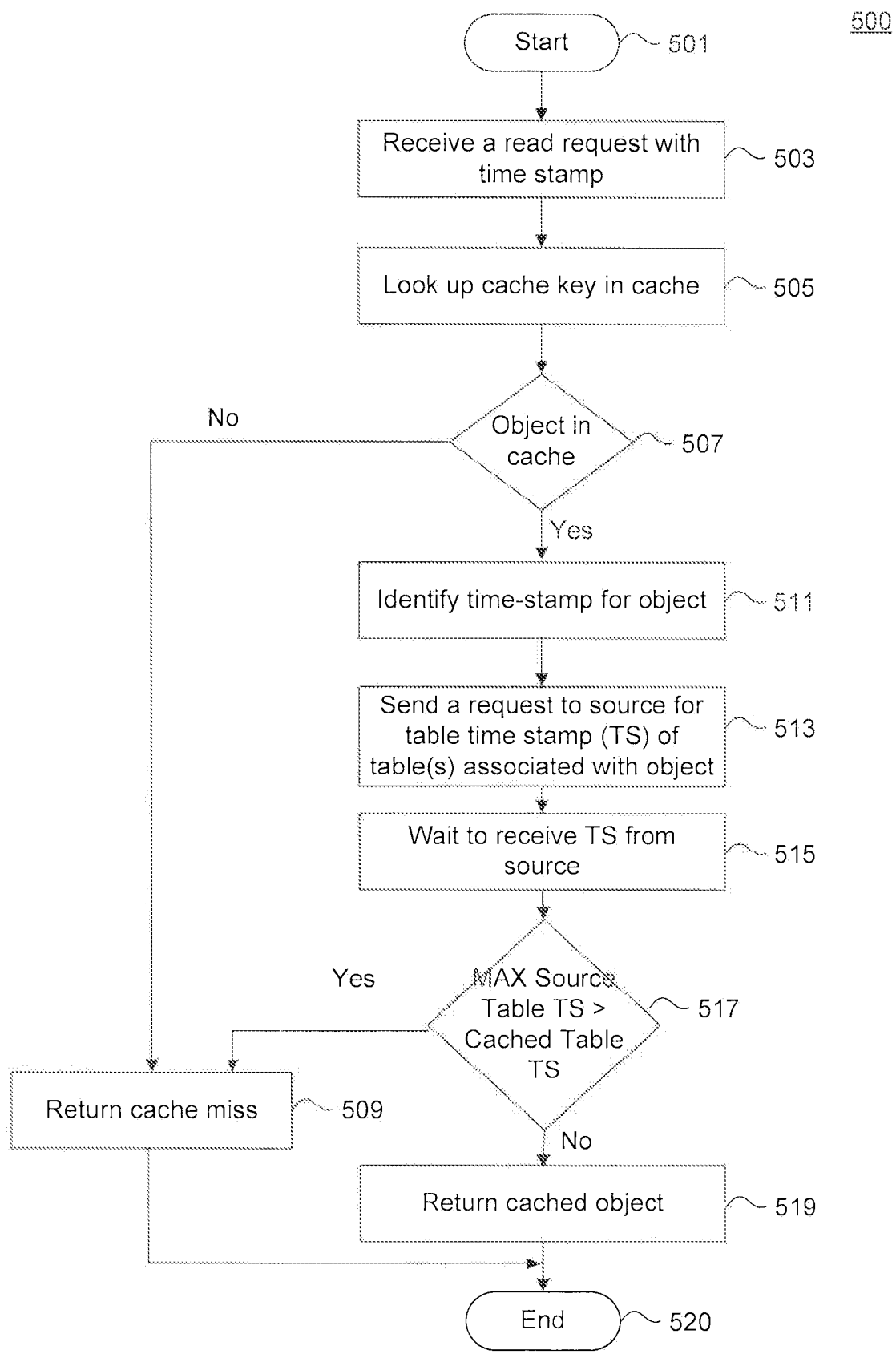
FIG. 5 is a flowchart illustrating a process for handling a read query at a cache node, according to an example embodiment.

Directing to FIG. 5, a flowchart describing a method 500 for handling a request, such as, but not limited to, a read query at cache node 104 according to an embodiment is illustrated. Method 500 can be performed by processing logic that can comprise hardware (e.g., circuitry, dedicated logic, programmable logic, microcode, etc.), software (e.g., instructions executing on a processing device), or a combination thereof. The method of flowchart 500 is described with continued reference to FIGS. 1-3. For example, the flowchart 500 can be implemented using cache node 104. The steps of the method of flowchart 500 are not limited to the order described below, and the various steps may be performed in a different order. Further, in embodiments, two or more steps of the method of flowchart 500 may be performed simultaneously with each other.

The method 500 starts at step 501 and moves to step 503. At step 503, cache node 104 receives a request such as a read request. Subsequently, in step 505, cache node 104 performs a look up to locate the cache key associated with the read request. This may be done by searching the data structures stored in cache node 104, and depicted in FIG. 3. The cache keys 301a-301n may be sorted, unsorted, stored in a hash table, linked list, doubly linked list, a tree or other data structures. Accordingly, cache node 104 can search for a cache key among all cache keys 301a-301n according to the data structure in which they are stored.

In step 507, cache node 104 makes a check to determine whether the look up was successful. If the look up was successful, it is indicated that a copy of the data object requested in the read request is stored in a cached entity in the cache node, as a result of which, the process is moved to step 511. If however, it is determined in step 507 that no cache key associated with the read request is found in the cache node, the process moves to step 509, and subsequently ends in step 520.

In steps 511-517, cache node 104 determines whether the time stamp of the cached copy of the table containing the object requested in the request (e.g., a read request) is up-to-date or old. In step 511, cache node 104 retrieves the time stamp for the cached entity containing the object. In step 513, cache node 104 sends a request to source 513 to identify the latest time stamp associated with each of the one or more database tables associated with the cached entity containing the object. In step 515, cache node 104 may perform a wait operation until a response is received from DBMS 102. The wait may have a pre-determined upper bound, e.g., 2 seconds, after which, the method moves to step 509 indicating a cache miss.

After cache node 104 receives a response from DBMS 102, the method moves to step 517, wherein cache node 104 compares the maximum value among the one or more database table time stamps returned by DBMS 102 to the cached entity time stamp corresponding to the cached entity containing the object. If it is determined that the maximum value of the one or more database table times stamps is greater than the cached entity time stamp, it means that the database table time stamp of at least one of the database tables associated with the cached entity is greater than the cached entity time stamp. In this case, the cached object is determined to be stale, and the method moves to step 509. However, if it is determined that all of the database table time stamps associated with the cached entity have the same value as the cached time stamp (i.e., the maximum value among the one or more database table time stamps is the same as the cached entity time stamp), the method moves to step 519, wherein the cached object is returned in response to the read query received in step 503. In one embodiment, if one or more source tables associated with the cached entity that includes the object are not registered with, for example, table update tracker 223, the cache node may receive no response at step 515 and the method moves to step 509 indicating a cache miss. Additionally or alternatively, in the case where one or more source tables are not registered, the method at step 517 cannot determine the maximum source table time stamp because the cache node does not receive and will not have all the requested time stamps. In this example, the method again can move to step 509 indicating a cache miss. According to one example, as discussed below, if one or more source tables are not registered, the source node can register them before sending the table time stamps to the cache node (at step 515 the cache node receives the table time stamp.)

According to one example, a reader, for example client 101 has a snapshot time stamp (sTS) indicating the last time the reader has requested a query. When the reader submits a query, the snapshot time stamp can be compared to the cached entity time stamp associated with that query. In one embodiment, these processes can be performed by, for example, engine 201, cache manager 211, etc. If the cached entity time stamp is equal to the snapshot time stamp, the reader "sees" the same snapshot and therefore, the validity of the result of the query obtained from the cached entity associated with the query can be approved. If the cached entity time stamp is less than snapshot time stamp and maximum table time stamp is less than or equal to cached entity time stamp, then the related tables have not been updated since the entry is cached and therefore, the validity of the result of the query requested can be approved.

However, if the cached entity time stamp is less than snapshot time stamp and maximum table time stamp is more than cached entity time stamp, then either the related tables have been updated but the reader cannot "see" them, or related tables have been updated more than once. When this condition occurs the validity of the result of the query requested can be rejected. In this case, there is a possibility that the cached entity can be valid for the reader, and therefore, there is a possibility of false rejection. If the cached entity time stamp is greater than the snapshot time stamp, the validity of the result of the query requested can be rejected. Similar to the previous case, in this case there is a possibility that the cached entry can be valid for the reader, and therefore, there is a possibility of false rejection.

Figure 6A:
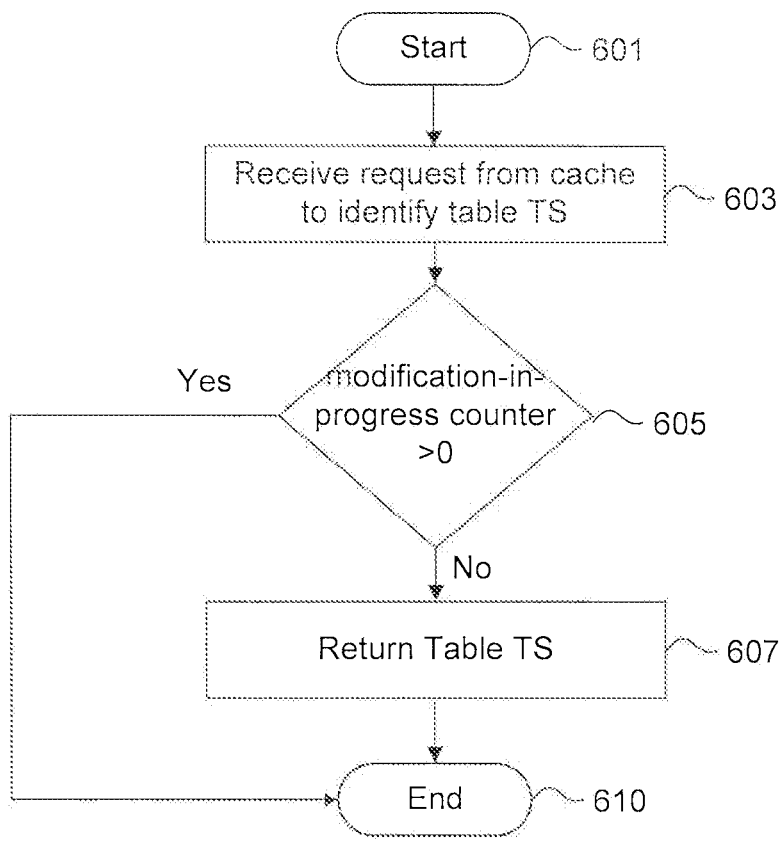
FIG. 6A is a flowchart describing a method for handling requests for identifying time stamps for database tables, according to an example embodiment.

Directing to FIG. 6A, a flowchart describing a method 600 for handling requests for identifying a table time stamp for a database table, such as any of tables 215a-215n, in DBMS, such as DBMS 102, is illustrated. Method 600 can be performed by processing logic that can comprise hardware (e.g., circuitry, dedicated logic, programmable logic, microcode, etc.), software (e.g., instructions executing on a processing device), or a combination thereof. The method of flowchart 600 is described with continued reference to FIGS. 1-3. For example, the flowchart 600 can be implemented using engine 201, table update tracker 223, or other components of DBMS 102. The steps of the method of flowchart 600 are not limited to the order described below, and the various steps may be performed in a different order. Further, in embodiments, two or more steps of the method of flowchart 620 may be performed simultaneously with each other.

Method 600 starts at step 601 and moves to step 603. At step 603, a source server, such as DBMS 102 receives a request from a cache node, such as cache node 104a, to identify the current time stamp for one or more source database table(s), such as database table 215a, stored in DBMS 102. In one example, after receiving the request from the cache node, the source node (e.g., DBMS 102) can determine whether the source database table(s) that cache node 104a has requested has registered with source node for caching or not. If the source database table(s) has registered with the source node for caching, the method can continue with step 605. However, if the source node determines that the source database table(s) (that the cache node is requiting its table time stamp) has not registered for caching, the source node can register the source database table(s) for caching. In one example, a table such as table 801 in FIG. 8 can be used to register the source database table(s) with its corresponding cache node(s). In this example, the source node can use the cache node(s) identifier (ID) to register the source database table(s) with its corresponding cache node(s). In one example, registering the source database table(s) can also include generating corresponding modification-in-progress counter and/or table time stamp for the source database table(s). After registering, the method can continue at step 605

In step 605, DBMS 102 determines whether the value of the modification-in-progress counter corresponding to database table 215a, e.g., modification-in-progress counter 217a is greater than zero. If DBMS 102 determines that the value of modification-in-progress counter 217a is greater than zero, it is indicated that database table 217a is currently undergoing modification. Accordingly, DBMS 102 does not send any response to the request received in step 603, and the method simply ends at step 610. However, if at step 605, it is determined that the modification-in-progress counter is equal to zero, then DBMS 102 returns the time stamp associated with the database table 217a to the cache node. The method subsequently ends in step 610. It is noted that although method 600 is illustrated with one table, this method can include more than one table and accordingly, more than one modification-in-progress counters can be involved.

Figure 6B:
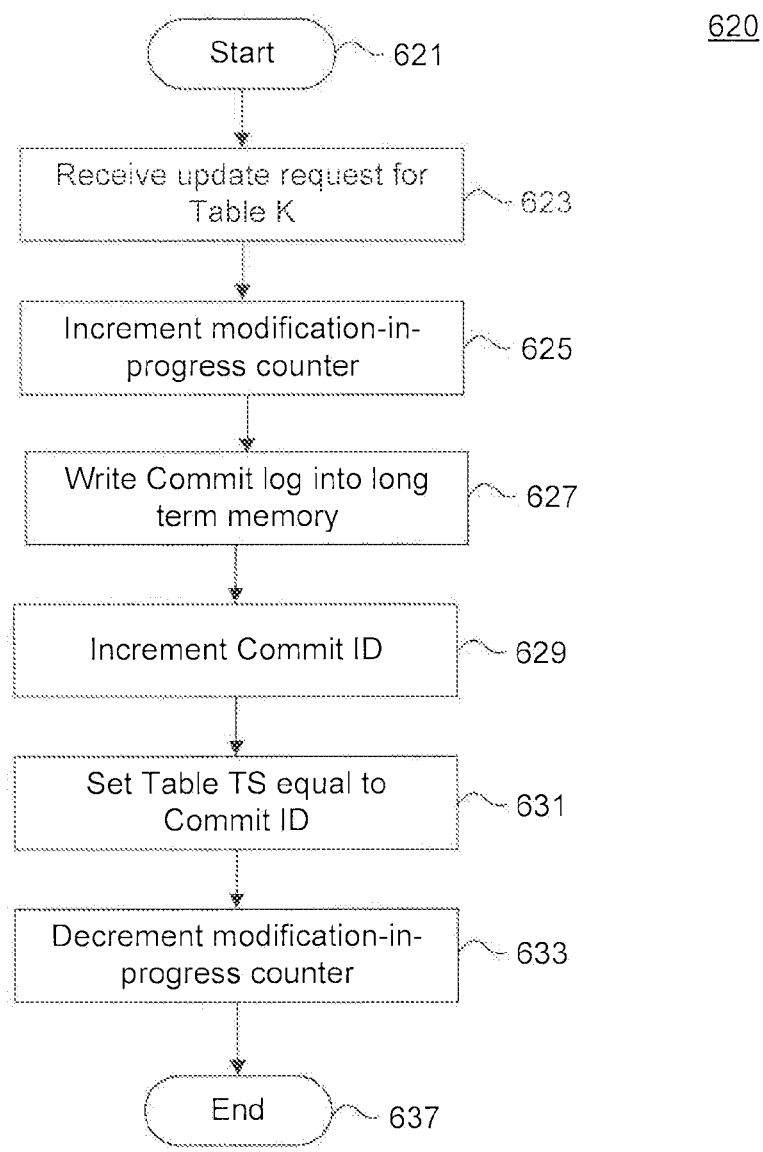
FIG. 6B is a flowchart describing a method for handling database update requests, according to an example embodiment.

Directing to FIG. 6B, a flowchart describing a method 620 for handling database update requests at a DBMS, such as DBMS 102, is illustrated. Method 620 can be performed by processing logic that can comprise hardware (e.g., circuitry, dedicated logic, programmable logic, microcode, etc.), software (e.g., instructions executing on a processing device), or a combination thereof. The method of flowchart 620 is described with continued reference to FIGS. 1-3. For example, the flowchart 620 can be implemented using engine 201, table update tracker 223, or other components of DBMS 102. The steps of the method of flowchart 620 are not limited to the order described below, and the various steps may be performed in a different order. Further, in embodiments, two or more steps of the method of flowchart 620 may be performed simultaneously with each other.

The method starts at step 621 and moves to step 623. At step 623, DBMS 102 receives a request for updating data stored in, or metadata associated with, a database table K (such as database table 215a). At step 625, the value of the modification-in-progress counter is incremented. According to one example, table update tracker 223 can be configured to update the value of modification-in-progress counter.

The method subsequently moves to step 627, where commit engine 207 (as an example) can write the commit log (that can be a log that can permanently mark that the corresponding transaction is successfully committed and previously written data modification log is valid) to a long term memory storage (e.g., a non-volatile log storage such as a disk).

Subsequently, the method moves to step 629, wherein the commit ID (e.g., commit ID 221, is incremented. After that, in step 633, the time stamp associated with the database table (such as database table time stamp 219a) is set equal to the commit ID. After this point, there are no more data modification actions are required to take place. Accordingly, at step 633, the modification-in-progress counter is decremented back to zero, and the method ends in step 637.

According to one example, steps 625-633 can be part of a transaction commit and step 623 can be repeated within a transaction.

Efficient Inter-Node Caching

FIGS. 7, 8A, 8B, 9, and 10 describe how a local copy of source table time stamps can be stored in a cache node and invalidated synchronously with the source node, according to an embodiment. In one example, DBMS 102 that includes tables 215a-215n can be a source node that includes the source tables from which cached entities are cached. Additionally or alternatively, a source node can be any processing logic that can comprise hardware (e.g., circuitry, dedicated logic, programmable logic, microcode, etc.), software (e.g., instructions executing on a processing device), or a combination thereof, that can include source tables from which cached entities are cached.

Figure 7:
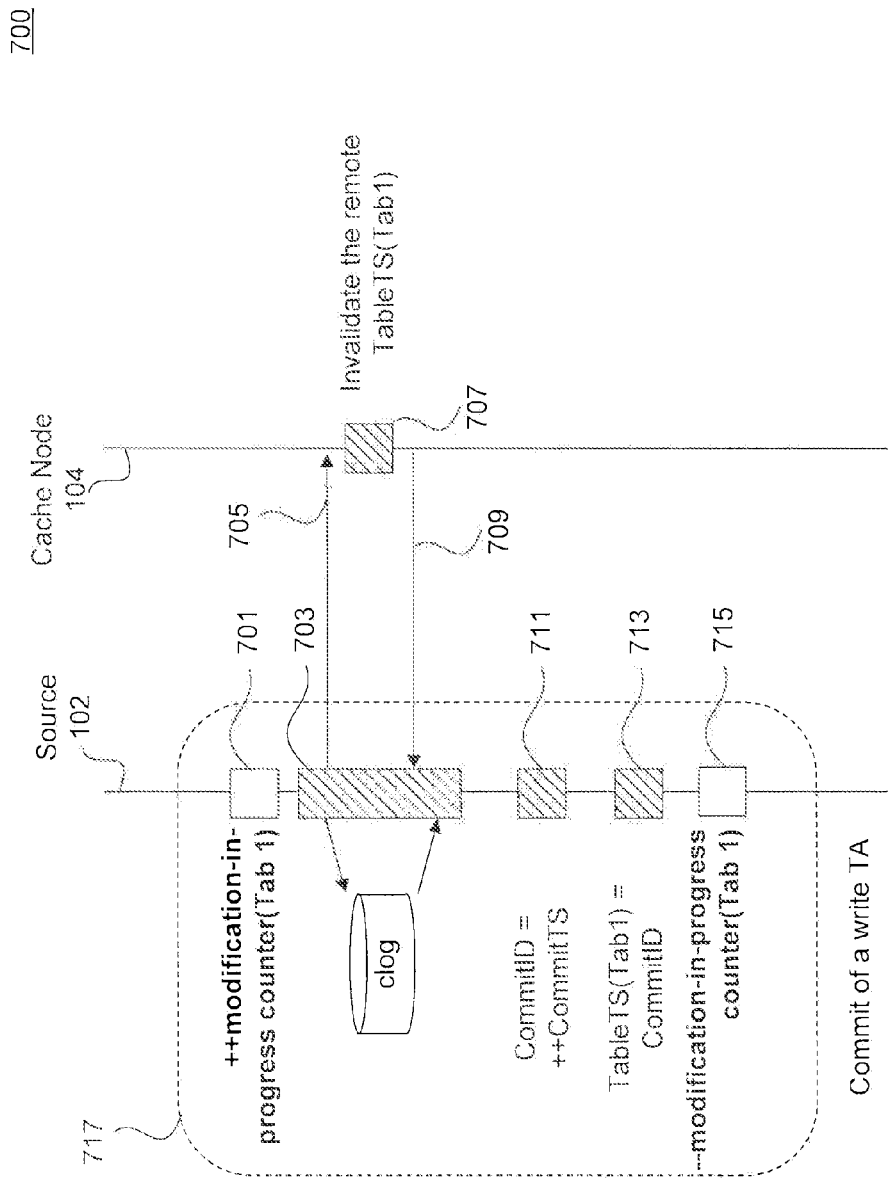
FIG. 7 is a sequence diagram describing the process of invalidating a remote copy of table time stamp in a cache node, according to an embodiment.

Directing to FIG. 7, an example sequence diagram 700 describing the process of invalidating a remote copy of table time stamp in a cache node is illustrated, according to an embodiment. In order to facilitate describing this process, data structures previously introduced in FIGS. 2 and 3 are often referred to. Time diagram 700 can be performed by processing logic that can comprise hardware (e.g., circuitry, dedicated logic, programmable logic, microcode, etc.), software (e.g., instructions executing on a processing device), or a combination thereof.

In step 717, DBMS 102 receives an update request to update a table (e.g., a commit request) and performs the update request (e.g., the commit request). In one example, commit engine 207 can be configured to perform the update request (e.g., the commit request). The update request can include a write transaction. To handle this, at step 701, DBMS 102 through, for example, table update tracker 223, increments the value of the modification-in-progress counter corresponding to the database table, such as modification-in-progress counter 217a. At step 703, commit engine 207 (as an example) can write the commit log (that can be a log that can permanently mark that the corresponding transaction is successfully committed and previously written data modification log is valid) to a long term memory storage (e.g., a non-volatile log storage such as a disk). In one example, this operation can be a time consuming operation.

During the time that commit engine 207 writes the commit log to a long term memory, DBMS 102 can send a message to cache node 104 to invalidate one or more copies of table time stamps that are located in cache node 104. According to this exemplary embodiment, cache node 104 (as described in FIG. 3) includes table time stamps 307a-307m, which store information indicating the latest table time stamp for each table it has cached therein. For example, table time stamps 307a-307m correspond to cached entities 303a-303m and maintain the values of the latest time stamp of the corresponding source database tables 215a-215n in DBMS 102. For example, table time stamp 307a in cache node 104 is a copy of table time stamp 219a in DBMS 102. When commit request 717 requires a change in, for example, source table 215a, table time stamp 219a would be updated when the commit request is processed and completed. Accordingly, the copy of table time stamp 219a in cache 104—table time stamp 307a—should be invalidated (e.g., marked as invalid or deleted). However, since table time stamp 219a is updated at the end of commit 717, if during this time cache 104 refer to table time stamp 307a, cache 104 would find a wrong value for the table time stamp. Therefore, this embodiment is designed to invalidate the value in table time stamp 307a as soon as commit 717 starts. Accordingly, during step 703 that commit engine 207 performs I/O operations to affect the statements in the commit log to long term memory storage (e.g., disk), DBMS 102 sends message 705 to cache node 104 to invalidate the value of table time stamp 307. According to one example, 705 can be a remote call from source node 102 to cache node 104. In this example, the latency overhead can be reduced when the network I/O operation (e.g., remote calling to cache node 104) is overlapped with commit log operation. The commit log operation time can include, for example, the time needed for commit engine 207 to perform disk I/O operations. In one embodiment, the commit log operation time can exclude the time needed to update and store the commit ID 221.

At step 707, cache node 104 invalidates the table time stamp 307a in response to message 705. Next cache node 104 send a message 709 to DBMS 102 to indicate that the invalidation process has been performed in cache node 104. According to one example, 709 could be a response to remote call 705 after cache node 104 invalidates the table time stamp 307a. According to one example, message 709 can be a success indicator, such that in a distributed setup to avoid having cache nodes that are not marked as invalid.

At step 711, DBMS 102 increments the value of commit ID 221 to the next time stamp. According to on example, this step can include acquiring locks for commit ID 221. At step 713, DBMS 102 sets the table time stamp of the updated table 217a equal to the value of commit ID 221. According to on example, this step can include acquiring locks for the corresponding table time stamp. Finally, at step 715, the operations regarding affecting the commit statement issued at 717 is completed, and the value of modification-in-progress counter 217a is decremented, for example, back to zero. According to one example, this step can include releasing the locks for commit ID 221 and/or corresponding table time stamp.

Although FIG. 7 illustrates one source 102 and one cache node 104, it is noted the process 700 of FIG. 7 can be performed between one source 102 and multiple cache nodes. In this example, multiple cache nodes have cached the source table and/or cached entities that depend on the source table, which is being updated in process 700. Accordingly, source 102 notifies these multiple cache nodes to invalidate their copy of table time stamp. In this example, the invalidation message 705 can be multi-casted to multiple cache nodes. Also, although FIG. 7 illustrates a commit of a transaction that affects one table, it is noted multiple source tables in the source (e.g. DBMS 102) can be updated during the commit of the transaction and therefore, multiple modification-in-progress counters 217 can be involved in process 700. In this example, message 705 can include invalidation message for multiple copies of table time stamps in cache node 104 that correspond to the multiple source tables in the source (e.g. DBMS 102) that are being updated.

Figures 8A, 8B:
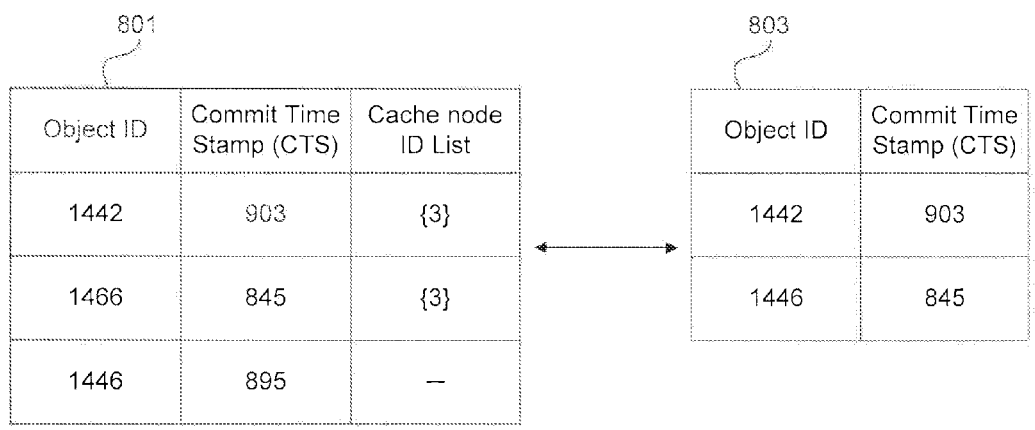
FIGS. 8A and 8B illustrate two exemplary, according to an embodiment.

FIGS. 8A and 8B illustrate two exemplary tables in DBMS 102 and cache node 104, respectively, according to an embodiment. According to this example, table 801 can be stored in cache manager 211 within DBMS 102. Additionally or alternatively, table 801 can be stored in other location within DBMS 102 such as, for example, table update tracker 223 and table 801 can be managed by, for example, table update tracker 223. Table 803 can be stored in cache node 104. Table 801 indicates which cache node has cached which table. Table 801 may be populated and updated using table update tracker 233. According to one example, table 801 can be maintained, when cache manager 211 and/or invalidator 213 registers a table as relevant for caching. As discussed above with respect to FIG. 2, all cache nodes that have cached query results from tables 215a-215n can automatically be registered with table time tracker 223 so that table time tracker 223 would maintain their copies of table time stamps. Alternatively, cache nodes can decide whether or not to register with table time tracker 223. Accordingly, the source node (e.g., DBMS 102) through, for example, table update tracker 223, can track the cache nodes that include cache entities that correspond to the source tables. By tracking the cache nodes, the source node can be able to invalidate copies of table time stamps if needed.

For example, table 801 illustrate that a cache node 3 has cached entities with object IDs 1442 and 1446. When DBMS 102 receives a commit request 717 associated with a specific table, DBMS 102 looks up in table 801 to determine whether any cache node has cached that specific table. If DBMS 102 determines that that specific table has been cached by a cache node, DBMS 102 performs method 700 of FIG. 7 to invalidate the table time stamp of that cache node. Table 803 at cache node 104 stores the object IDs of tables from which cached entities are cached in cache node 104 and their associated commit IDs.

Figure 9:
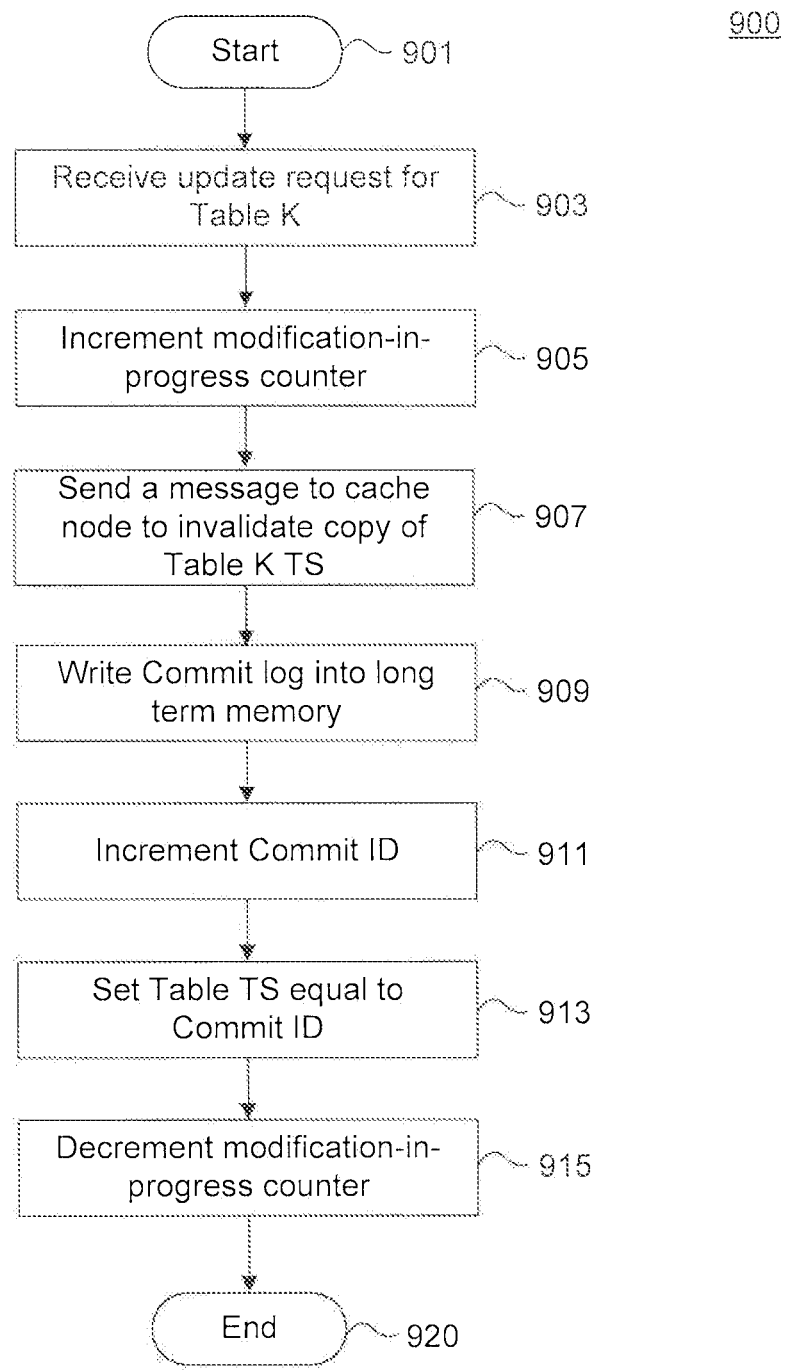
FIG. 9 is a flowchart describing a method for handling database update requests and an invalidation process of a copy of table time stamp at a cache node, according to an embodiment.

Directing to FIG. 9, a flowchart describing a method 900 for handling database update requests at a DBMS, such as DBMS 102, and an invalidation process of copy of table time stamp at a cache node is illustrated. Method 900 can be performed by processing logic that can comprise hardware (e.g., circuitry, dedicated logic, programmable logic, microcode, etc.), software (e.g., instructions executing on a processing device), or a combination thereof. The method of flowchart 900 is described with continued reference to FIGS. 1-3. For example, the flowchart 900 can be implemented using at least one of engine 201, commit engine 207, table update tracker 223, or other components of DBMS 102. The steps of the method of flowchart 900 are not limited to the order described below, and the various steps may be performed in a different order. Further, in embodiments, two or more steps of the method of flowchart 900 may be performed simultaneously with each other.

The method starts at step 901 and moves to step 903. At step 903, DBMS 102 receives a request for updating data stored in, or metadata associated with, a database table K (such as database table 215*a*).

In step 905, the value of the modification-in-progress counter is incremented. According to one example, table update tracker 223 can be configured to update the value of modification-in-progress counter. The method subsequently moves to step 907, where DBMS 102 sends a message to a cache node, which has a copy of table K and/or a cache entity that depends on table K, to invalidate the copy of table time stamp associated with table K in that cache node. According to one embodiment, DBMS 102 stores a table such as table 801. DBMS 102 can use table 801 to determine which cache node(s) has a copy of source table K and/or a cache entity that depends on source table K. In this example, before step 907, DBMS 102 can use table 801 to determine the cache node(s) to which the invalidation message should be sent.

The method subsequently moves to step 909, where commit engine 207 (as an example) can write the commit log (that can be a log that can permanently mark that the corresponding transaction is successfully committed and previously written data modification log is valid) to a long term memory storage (e.g., a non-volatile log storage such as a disk). It is noted that although step 907 is shown before step 909, at least these two steps can be performed in any other order, such as substantially simultaneously. By substantially overlapping these two operations, the latency overhead can be reduced when the network I/O operation (e.g., remote calling or message passing to cache node 104) is overlapped with commit log operation.

Subsequently, the method moves to step 911, wherein the commit ID (e.g., commit ID 221, is incremented. After that, in step 913, the time stamp associated with the database table (such as database table time stamp 219*a*) is set equal to the commit ID. After this point, there are no more data modification actions are required to take place. Accordingly, at step 915, the modification-in-progress counter is decremented back to zero, and the method ends in step 920.

Figure 10:
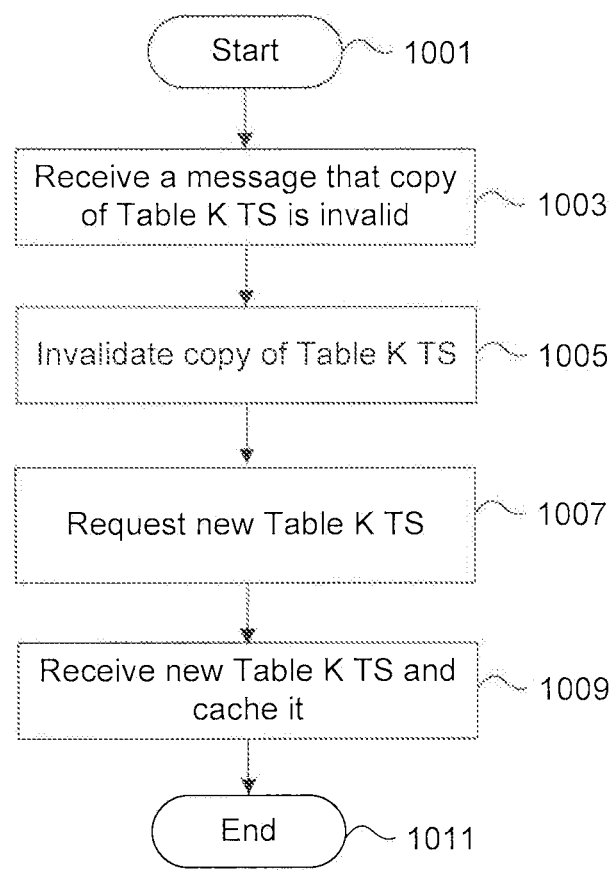
FIG. 10 is a flowchart describing a method for updating a copy of table time stamp at a cache node, according to an embodiment.

Directing to FIG. 10, a flowchart describing a method 1000 for updating a copy of table time stamp at a cache node, according to an embodiment is illustrated. Method 1000 can be performed by processing logic that can comprise hardware (e.g., circuitry, dedicated logic, programmable logic, microcode, etc.), software (e.g., instructions executing on a processing device), or a combination thereof. The method of flowchart 1000 is described with continued reference to FIGS. 1-3. For example, the flowchart 1000 can be implemented using cache node 104. The steps of the method of flowchart 1000 are not limited to the order described below, and the various steps may be performed in a different order. Further, in embodiments, two or more steps of the method of flowchart 1000 may be performed simultaneously with each other.

The method 1000 starts at step 1001 and moves to step 1003. At step 1003, cache node 104 receives an invalidation message from a source node, such as DBMS 102. The invalidation message is used to invalidate the copy of table time stamp associated with table K. For example, table time stamp 307*a* of FIG. 3 is associated with table time stamp 219*a* of table 215*a*. While table 215*a* is being updated (as discussed, for example, in FIG. 9) cache node 104 receives the invalidation message in step 1003 to invalidate cache node 104 table time stamp 307*a*.

In step 1005, cache node 104 invalidates table time stamp 307*a*, which is a copy of table time stamp 219*a* associated with table K. In step 1007, cache node 1007 can send a request to the source node, such as DBMS 102, for the new value of the table time stamp associated with table K. In step 1009 cache node 104 can receive the update table time stamp and can store the new value in table time stamp 307*a*.

Figure 11:
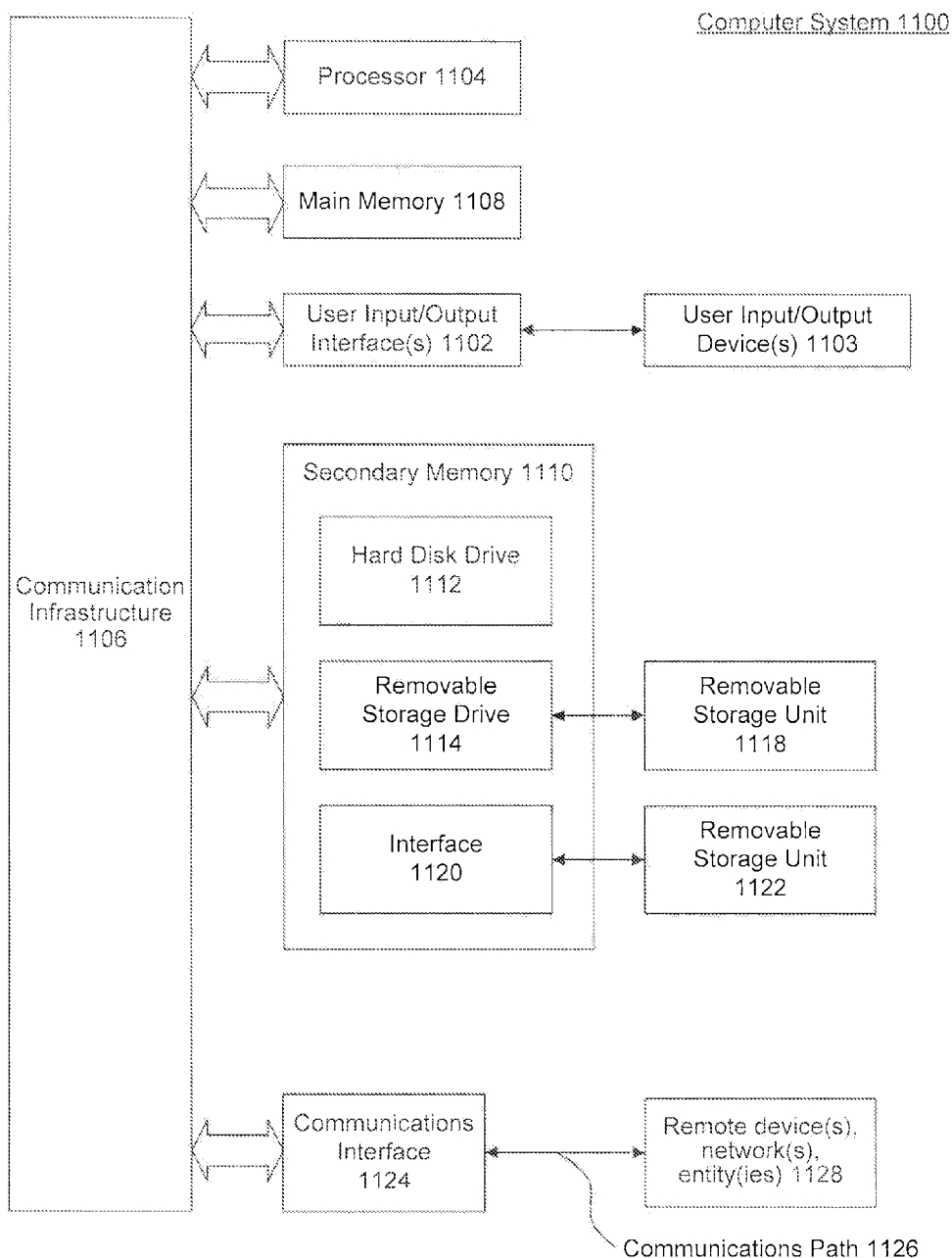
FIG. 11 is an example computer system useful for implementing various embodiments.

FIG. 11 is a block diagram of an example computer system in which embodiments may be implemented. Various embodiments can be implemented, for example, using one or more well-known computer systems, such as computer system 1100 shown in FIG. 11. Computer system 1100 can be any well-known computer capable of performing the functions described herein, such as computers available from International Business Machines, Apple, Sun, HP, Dell, Sony, Toshiba, etc.

Computer system 1100 includes one or more processors (also called central processing units, or CPUs), such as a processor 1104. Processor 1104 is connected to a communication infrastructure or bus 1106.

One or more processors 1104 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 1100 also includes user input/output device(s) 1103, such as monitors, keyboards, pointing devices, etc., which communicate with communication infrastructure 1106 through user input/output interface(s) 1102.

Computer system 1100 also includes a main or primary memory 1108, such as random access memory (RAM). Main memory 1108 may include one or more levels of cache. Main memory 1108 has stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to an exemplary embodiment, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

In an embodiment, a tangible apparatus or article of manufacture comprising a tangible computer useable or readable medium having control logic (software) stored thereon is also referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use the embodiments using data processing devices, computer systems and/or computer architectures other than that shown in FIG. 11. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more, but not necessarily all, exemplary embodiments contemplated by the inventor(s), and thus are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A method, comprising:
receiving, by one or more computing devices, at a source database, an update request to update data associated with a table stored at the source database;
modifying, by the one or more computing devices, a modification-in-progress data structure corresponding to the table to indicate that a modification is in progress for the table;
updating, by the one or more computing devices, data in the table based on the update request;
updating, by the one or more computing devices, a commit identification data structure to reflect that the source database has been updated;

updating, by the one or more computing devices, the value of a source table time stamp corresponding to the table based on the commit identification data structure;

modifying, by the one or more computing devices, the value of the modification-in-progress data structure to indicate that no modification is in progress for the table upon updating the value of the source table time stamp; and responding, by the one or more computing devices, to a request from a cache node holding a cached copy of the table with an indication that the cached copy is invalid based on either the modification-in-progress data structure indicating that a modification is in progress for the table, or the value of the source table time stamp being more recent than a time stamp corresponding to the cached copy of the table.

2. The method of claim 1, wherein modifying the modification-in-progress data structure comprises selecting the modification-in-progress data structure corresponding to the table from a plurality of modification-in-progress data structures corresponding to respective tables from a plurality of tables stored at the source database.

3. The method of claim 1, further comprising:
transmitting an update comprising a subset of data in the table to the cache node.

4. The method of claim 1, wherein the cache node comprises a cached entity including a copy of a subset of data in the table and wherein the cache node further comprises a cache key associated with the cached entity, the method further comprising:
directing a request for data associated with the table to the cache node if the cache key matches a request key associated with the request.

5. The method of claim 1, wherein the cache node comprises a cached entity including a copy of a subset of data in the table and wherein the cache node comprises a time stamp associated with the cached entity, further comprising:
directing a request for data associated with the table to the cache node if the cache key matches a request key associated with the request based on a comparison of the time stamp associated with the cached entity to the source table time stamp.

6. The method of claim 1, wherein the cache node comprises a cached entity including a copy of a subset of data in the table and wherein the cached entity further comprises a copy of a subset of data in another table stored at the source database.

7. The method of claim 1, further comprising:
writing a commit log to a non-volatile storage device.

8. A system comprising:
a memory; and
at least one processor coupled to the memory and configured to:
receive, at a source database, an update request to update data associated with a table stored at the source database;
modify a modification-in-progress data structure corresponding to the table to indicate that a modification is in progress for the table;
update data in the table based on the update request;
update a commit identification data structure to reflect that the source database has been updated;
update the value of a source table time stamp corresponding to the table based on the commit identification data structure;

modify the value of the modification-in-progress data structure to indicate that no modification is in progress for the table upon updating the value of the source table time stamp; and
respond to a request from a cache node holding a cached copy of the table with an indication that the cached copy is invalid based on either the modification-in-progress data structure indicating that a modification is in progress for the table, or the value of the source table time stamp being more recent than a time stamp corresponding to the cached copy of the table.

9. The system of claim 8, wherein modifying the modification-in-progress data structure comprises selecting the modification-in-progress data structure corresponding to the table from a plurality of modification-in-progress data structures corresponding to respective tables from a plurality of tables stored at the source database.

10. The system of claim 8, the at least one processor further configured to:
transmit an update comprising a subset of data in the table to the cache node.

11. The system of claim 8, wherein the cache node comprises a cached entity including a copy of a subset of data in the table and wherein the cache node further comprises a cache key associated with the cached entity, and the at least one processor is further configured to:
direct a request for data associated with the table to the cache node if the cache key matches a request key associated with the request.

12. The system of claim 8, wherein the cache node comprises a cached entity including a copy of a subset of data in the table and wherein the cache node comprises a time stamp associated with the cached entity, and the at least one processor is further configured to:
direct a request for data associated with the table to the cache node if the cache key matches a request key associated with the request based on a comparison of the time stamp associated with the cached entity to the source table time stamp.

13. The system of claim 8, wherein the cache node comprises a cached entity including a copy of a subset of data in the table and wherein the cached entity further comprises a copy of a subset of data in another table stored at the source database.

14. The system of claim 8, wherein the at least one processor is further configured to write a commit log to a non-volatile storage device.

15. A non-transitory computer-readable device having instructions stored thereon that, when executed by at least one computing device, causes the at least one computing device to perform operations comprising:
receiving, by one or more computing devices, at a source database, an update request to update data associated with a table stored at the source database;
modifying, by the one or more computing devices, a modification-in-progress data structure corresponding to the table to indicate that a modification is in progress for the table;
updating, by the one or more computing devices, data in the table based on the update request;
updating, by the one or more computing devices, a commit identification data structure to reflect that the source database has been updated;
updating, by the one or more computing devices, the value of a source table time stamp corresponding to the table based on the commit identification data structure;

modifying, by the one or more computing devices, the value of the modification-in-progress data structure to indicate that no modification is in progress for the table upon updating the value of the source table time stamp; and responding, by the one or more computing devices, to a request from a cache node holding a cached copy of the table with an indication that the cached copy is invalid based on either the modification-in-progress data structure indicating that a modification is in progress for the table, or the value of the source table time stamp being more recent than a time stamp corresponding to the cached copy of the table.

16. The non-transitory computer-readable device of claim 15, wherein modifying the modification-in-progress data structure comprises selecting the modification-in-progress data structure corresponding to the table from a plurality of modification-in-progress data structures corresponding to respective tables from a plurality of tables stored at the source database.

17. The non-transitory computer-readable device of claim 15, the operations further comprising:

transmitting an update comprising a subset of data in the table to the cache node.

* * * * *